(12) United States Patent
Olesen

(10) Patent No.: US 9,523,354 B2
(45) Date of Patent: Dec. 20, 2016

(54) ICE DETECTION METHOD AND SYSTEM FOR WIND TURBINE BLADES

(75) Inventor: Ib Svend Olesen, Randers (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 856 days.

(21) Appl. No.: 13/809,977

(22) PCT Filed: Jul. 12, 2011

(86) PCT No.: PCT/DK2011/050274
§ 371 (c)(1),
(2), (4) Date: Mar. 28, 2013

(87) PCT Pub. No.: WO2012/007004
PCT Pub. Date: Jan. 19, 2012

(65) Prior Publication Data
US 2013/0177417 A1 Jul. 11, 2013

Related U.S. Application Data

(60) Provisional application No. 61/364,079, filed on Jul. 14, 2010.

(30) Foreign Application Priority Data

Jul. 14, 2010 (GB) .................................. 1011858.6

(51) Int. Cl.
*F03D 80/40* (2016.01)
*F03D 17/00* (2016.01)
(Continued)

(52) U.S. Cl.
CPC ........... *F03D 11/0025* (2013.01); *F03D 17/00* (2016.05); *F03D 80/40* (2016.05); *G01L 1/246* (2013.01);
(Continued)

(58) Field of Classification Search
CPC . G01L 1/246; G01M 5/0016; F05B 2260/845; F05B 2267/808; F05B 2267/802; F05B 2267/331; Y02E 10/72; Y02E 10/721; Y02E 10/722
(Continued)

(56) References Cited

U.S. PATENT DOCUMENTS

| | | | | |
|---|---|---|---|---|
| 8,511,177 B1 * | 8/2013 | Makaremi | ........... | G01M 5/0033 73/847 |
| 9,032,807 B2 * | 5/2015 | Olesen | ................ | F03D 11/0025 416/1 |

(Continued)

FOREIGN PATENT DOCUMENTS

| | | | | | |
|---|---|---|---|---|---|
| DE | EP 0995904 | A2 * | 4/2000 | ........... | F03D 7/0204 |
| DK | GB 2465790 | A * | 6/2010 | .......... | F03D 11/0091 |

(Continued)

OTHER PUBLICATIONS

EP 0995904 A2 English Translation.*
(Continued)

*Primary Examiner* — Thomas Denion
*Assistant Examiner* — Jessica Kebea
(74) *Attorney, Agent, or Firm* — Patterson + Sheridan, LLP

(57) ABSTRACT

The invention provides a method and system of detecting ice or other foreign matter on a wind turbine blade or damage to a wind turbine blade. The method in one aspect comprises: measuring twisting torque on the blade about its longitudinal axis to provide a detected torque signal; comparing a value based on the detected torque signal with a comparison value, the comparison value derived from one or more measured parameters having a predetermined relationship with the twisting torque about the longitudinal axis of the blade when the blade is operating under normal operat- (Continued)

ing conditions; and determining that ice or other foreign matter is on the blade or that the blade is damaged if the value based on the detected torque signal differs from the comparison value by more than a predetermined amount. Wind turbine blades are designed such that any change in the shape of the blade reduces twisting torque on the blades significantly. Torque about the longitudinal axis of the blade can therefore be used as a sensitive indicator of ice on the blade and of damage to the blade.

21 Claims, 5 Drawing Sheets

(51) Int. Cl.
    *G01L 1/24* (2006.01)
    *F03D 11/00* (2006.01)
    *G01M 5/00* (2006.01)

(52) U.S. Cl.
    CPC ....... *G01M 5/0016* (2013.01); *F05B 2260/845* (2013.01); *F05B 2270/331* (2013.01); *F05B 2270/802* (2013.01); *F05B 2270/808* (2013.01); *Y02E 10/722* (2013.01)

(58) Field of Classification Search
    USPC ....................................................... 416/61, 1
    See application file for complete search history.

(56) References Cited

U.S. PATENT DOCUMENTS

| | | |
|---|---|---|
| 2003/0216879 A1 | 11/2003 | Hashemian |
| 2005/0276696 A1 | 12/2005 | LeMieux |
| 2006/0140761 A1 | 6/2006 | LeMieux |
| 2008/0078228 A1 | 4/2008 | Nies |
| 2009/0169357 A1 | 7/2009 | Slack |
| 2009/0246019 A1* | 10/2009 | Volanthen ........... F03D 11/0025 416/1 |
| 2009/0263246 A1 | 10/2009 | Bolz |
| 2009/0324409 A1* | 12/2009 | Volanthen .............. G01B 11/18 416/61 |
| 2010/0054941 A1* | 3/2010 | Hoffmann ............. F03D 7/0204 416/61 |
| 2010/0209247 A1 | 8/2010 | Becker et al. |
| 2012/0055247 A1* | 3/2012 | Gonzalez Castro F03D 11/0091 73/455 |
| 2015/0078895 A1* | 3/2015 | Odgaard ............... F03D 7/0224 416/1 |

FOREIGN PATENT DOCUMENTS

| | | | |
|---|---|---|---|
| EP | 1748185 A1 | 1/2007 | |
| NL | WO 2008095707 A2 * | 8/2008 | ........... F03D 1/0675 |
| WO | 2008095707 A2 | 8/2008 | |
| WO | 2009059606 A2 | 5/2009 | |
| WO | 2009067051 A1 | 5/2009 | |
| WO | 2009109655 A1 | 9/2009 | |
| WO | 2010016764 A1 | 2/2010 | |
| WO | 2010091675 A2 | 8/2010 | |
| WO | 2012007005 A2 | 1/2012 | |

OTHER PUBLICATIONS

WO 2008095707 A2 English Translation.*
"Confidence Interval" Apr. 24, 2009.*
International Search Report dated Mar. 27, 2012 for International Application No. PCT/DK2011/050274, 3 pages.
GB Combined Search and Examination Report dated Nov. 18, 2010 for Application No. GB1011858.6, 6 pages.
International Search Report dated Mar. 27, 2012 for International Application No. PCT/DK2011/050275, 3 pages.

* cited by examiner

ICE DETECTION METHOD AND SYSTEM FOR WIND TURBINE BLADES

FIELD OF THE INVENTION

The present invention relates to the detection of ice or other foreign matter on wind turbine blades.

BACKGROUND OF THE INVENTION

FIG. 1 illustrates a wind turbine 1. The wind turbine comprises a wind turbine tower 2 on which a wind turbine nacelle 3 is mounted. A wind turbine rotor 4 comprising at least one wind turbine blade 5 is mounted on a hub 6. The hub 6 is connected to nacelle 3 through a low speed shaft (not shown) extending from the nacelle front. The wind turbine illustrated in FIG. 1 may be a small model intended for domestic or light utility usage, or may be a large model, such as those that are used in large scale electricity generation or on a wind farm for example. In the latter case, the diameter of the rotor could be as large as 100 metres or more.

Ice formation on wind turbine blades is a well known problem, as wind turbines are frequently installed in cold and stormy environments. The accrual of ice or other matter, such as dirt, is a hazard and leads to reduced wind turbine performance. It is a hazard because ice or other matter on the turbine blades may fall from the blades at any time, and in large amounts. It reduces wind turbine performance because it affects the aerodynamic behaviour of the blades and because the turbine may need to be stopped to remove hazardous ice or dirt.

The detection of ice on wind turbine blades has been achieved in a number of ways. One method that has been proposed is to monitor the bending loads on wind turbine blades.

It is known to provide the blades of a wind turbine with strain gauges in order to monitor the bending moment on the blades. This can be used in order to monitor the loads applied to the blades. Optical strain sensors, such as Fibre Bragg Grating strain sensors, are known for monitoring strain in wind turbine blades. Optical strain sensors for measuring the strain in wind turbine blades, and in particular for measuring the flapwise bending strain, are typically positioned at the root of the turbine blade. Measurement of flapwise bending strain of a wind turbine blade requires a measurement technique capable of distinguishing between strain on a strain sensor as a result of bending forces and strain resulting from other forces such as centripetal force. In order to do this, strain sensors are arranged pairwise around the root of the turbine blade, with the sensors in each pair arranged diametrically opposite each other. The strain due to bending detected by the sensors in each pair should be is approximately equal but of opposite sign, as one sensors will be under tension and one under compression. Strain due to centripetal force should be the same for both sensors. Using two pairs of sensors allows a bending strain to be determined in two dimensions, i.e. edgewise and flapwise. From changes in these bending strains, the build up of ice can be detected.

Although this method of measuring bending strain gives good results in theory, in practice it is not as precise as some applications need. This is the result of several factors. First, the material used to form the turbine blades is not absolutely homogenous. Second, the thickness of the material forming the turbine blades is not absolutely uniform. Third, the temperature of the wind turbine blade may vary slightly from one spot to another. Fourth, the sensors may not be mounted absolutely accurately. Fifth, in practice, sensors often fail or give erroneous results during their service lifetime.

We have recognised that there is a need for a more sensitive way of detecting the build up of ice or other matter on wind turbine blades.

SUMMARY OF THE INVENTION

In a first aspect of the invention, there is provided a method of detecting ice or other foreign matter on a wind turbine blade or damage to a wind turbine blade, the wind turbine blade mounted to a hub and having a longitudinal axis extending away from the hub, comprising:
  measuring twisting torque on the blade about its longitudinal axis to provide a detected torque signal;
  comparing a value based on the detected torque signal with a comparison value, the comparison value derived from one or more measured parameters having a predetermined relationship with the twisting torque about the longitudinal axis of the blade when the blade is operating under normal operating conditions; and
  determining that ice or other foreign matter is on the blade or that the is blade is damaged if the value based on the detected torque signal differs from the comparison value by more than a predetermined amount.

Wind turbine blades are designed such that any change in the shape of the blade reduces twisting torque on the blades significantly. Torque about the longitudinal axis of the blade can therefore be used as a sensitive indicator of ice on the blade and of damage to the blade.

The term "twisting torque" is intended to mean the twisting forces on the blade as distinguished from any bending forces on the blade.

The value based on the detected torque signal may simply be the detected torque signal. The comparison value is calculated from one or more measured parameters having a predetermined relationship with the twisting torque about the longitudinal axis of the blade when the blade is operating under normal operating conditions. In this context, normal operating conditions mean conditions in which it is known that there is no significant ice or other matter on the blade and no damage to the blade.

Preferably, the one or more measured parameters comprise bending moments on the blade. By comparing the bending moments with the twisting torque about the longitudinal axis of the blade an accurate evaluation of the aerodynamic performance of the blade can be made.

Preferably, the method further comprises establishing a relationship between the bending moments on the blade and the twisting torque about the longitudinal axis of the blade under normal operating conditions. The relationship may depend on the structure of the blade, the wind speed, air density, temperature, and angle of attack of the blade.

The twisting torque may be measured by one sensor or by a plurality of sensors. The detected torque may be an average of twisting torque measurements from a plurality of sensors.

Preferably, the method further comprises measuring the bending moments on the blade.

Preferably, the step of measuring the bending moments on a wind turbine blade, comprises:
  locating at least three strain sensors on the turbine blade, in use each strain sensor providing a strain measurement, the strain sensors located such that edgewise and flapwise bending can be determined from the strain measurements;

calculating a plurality of resultant bending strains using the strain measurements;

calculating an average resultant bending strain from the plurality of resultant bending strains.

The individual strain measurements may be converted into bending moments before calculating resultant bending moments and average resultant bending moment. This is useful if the relationship between bending strain and bending moment is not the same for all of the sensors. This might be the case if the blade cross-section at the position of the sensors is not symmetrical and homogenous. Accordingly, the terms "resultant bending strain" and "average resultant bending strain" as used herein should be interpreted to include "resultant bending moment" and "average resultant bending moment" respectively.

Preferably, the method further comprises calculating a confidence value for the average resultant bending strain. Preferably, the confidence value for the average resultant bending strain is based on a comparison of the plurality of resultant bending strains with each other, or with the average resultant bending strain. The confidence value for the average resultant bending strain may, for example, be based on the value of a standard deviation of a normal distribution fitted to the plurality of resultant bending strains.

A confidence value in the bending strain measurement is useful because it provides a measure of confidence of whether there is ice on the blade or whether an anomaly in the measurements might simply be an error within the measurement resolution of the sensor arrangement.

The strain sensors are preferably arranged such that they are all substantially equidistant from the root end of the blade. However, if the sensors are all located in a portion of the blade that is symmetrical and homogenous in cross-section this is not always necessary.

Preferably, the step of measuring the bending strain further comprises the step of calculating a confidence value for a first sensor based on a comparison of resultant bending strains derived from the strain measurement from the first sensor with the average resultant bending strain. This allows faulty, badly installed or broken sensors to be identified and ignored in strain calculations.

Each resultant bending strain is preferably calculated from bending strain measurements taken from a different pair of strain sensors, where the strain sensors in each pair provide bending strain measurements in directions non-parallel to one another. Depending on the type and orientation of the strain sensors, each bending strain measurement may be a simple strain measurement output from a strain sensor or may be a strain measurement from a strain sensor processed to remove non-bending components from the strain measurement.

The confidence value for the first sensor may be calculated in a number of ways. For example the confidence value may be based on an absolute difference between the resultant bending strains derived from measurement from the first sensor with the average resultant bending strain. Alternatively, the confidence value may be based on a number of standard deviations that the bending strain measurement from the first sensor is from the average resultant bending strain.

Preferably, the method further comprises locating at least four strain sensors on the turbine blade, and further comprises comparing the confidence value with a confidence threshold, and if the confidence value is less than the confidence threshold, re-calculating an average resultant bending strain without using the strain measurement from the first strain sensor.

Preferably, the strain sensors are located to provide bending strain measurements in at least three non-parallel directions.

Preferably, each of the strain sensors is an optical strain sensor, such as a Fibre Bragg Grating sensor.

Preferably, the method further comprises locating at least five strain sensors on the turbine blade. Preferably, the strain sensors are located symmetrically around the longitudinal axis of the blade. This allows for a simple calculation of bending strain for each strain sensor and the ability to recalculate the average bending strain based on measurements from only three or four of the strain sensors if one or two strain sensors give erroneous measurements. To provide for greater redundancy and greater resolution, precision and confidence, a greater number of strain sensors may be used.

Alternatively, or in addition to bending moments, the one or more measured parameters having a predetermined relationship with the twisting torque about the longitudinal axis of the blade may include wind speed and power output from the wind turbine. The method may further include the step of establishing a relationship between twisting torque about the longitudinal axis of the blade and the wind speed and power output from the wind turbine under normal operating conditions.

Preferably the step of measuring twisting torque on the blade about its longitudinal axis comprises locating strain sensors on the blade. Preferably, the strain sensors are located such that twisting torque and the bending moment can be derived from outputs of the strain sensors.

Bending moments are typically measured by mounting strain sensors parallel with the longitudinal axis of the blade. Preferably, a method in accordance with the invention comprises the step of locating at least one pair of adjacent strain sensors on the blade such that their sensitive axes are non-parallel with the longitudinal axis of the blade. Preferably, the sensitive axes of each pair of sensors are disposed symmetrically about a line parallel with the longitudinal axis of the blade, but are not perpendicular to it. The strain measurements from each pair of sensors can then be simply combined to resolve bending strain and torque strain. For example, each pair of sensors may be arranged in a "V" shape or an "X" shape.

In a second aspect of the invention, there is provided a system for detecting ice or other foreign matter on a wind turbine blade or damage to a wind turbine blade, the wind turbine blade mounted to a hub and having a longitudinal axis extending away from the hub, comprising:

one or more sensors mounted on the turbine blade and configured to provide a measure of the twisting torque on the blade about its longitudinal axis; and a processor configured to compare a value based on the measure of the torque with a comparison value, the comparison value derived from one or more measured parameters having a predetermined relationship with the twisting torque about the longitudinal axis of the blade when the blade is operating under normal operating conditions, and determine that ice or other foreign matter is on the blade, or that the blade is damaged if the value based on the measure of the twisting torque differs from the comparison value by more than a predetermined amount.

Preferably, the processor is configured to calculate the comparison value based on one or more measured parameters having a predetermined relationship with the twisting torque about the longitudinal axis of the blade when operating under normal operating conditions.

Preferably, the one or more measured parameters comprise a bending moment on the blade.

Preferably, the system comprises a plurality of sensors mounted on the turbine blade. Preferably, the sensors are all positioned substantially equidistant from the root end of the blade.

Preferably, the plurality of sensors are configured to allow both twisting torque about the longitudinal axis of the blade and bending moments to be derived from their outputs. Preferably the plurality of sensors comprise at least one pair of adjacent strain sensors positioned on the blade such that their sensitive axes are non-parallel with the longitudinal axis of the blade. Preferably, the sensitive axes of each pair of sensors are disposed symmetrically about a line parallel with the longitudinal axis of the blade but are not perpendicular to it. The strain measurements from each pair of sensors can then be simply combined to resolve bending strain and torque strain. For example, each pair of sensors may be arranged in a "V" shape or an "X" shape.

Preferably, the strain sensors comprise at least three strain sensors located on the turbine blade, in use, each strain sensor providing a strain measurement, the strain sensors located such that edgewise and flapwise bending can be determined from the strain measurements; and
  the processor is connected to each of the strain sensors, and configured to:
  calculate a plurality of resultant bending strains using the strain measurements;
  calculate an average resultant bending strain from the plurality of resultant bending strains.

Preferably, the processor is configured to calculate a confidence value for the average resultant bending strain. Preferably, the signal processor is configured to calculate the confidence value for the average resultant bending strain based on a comparison of the plurality of resultant bending strains with each other, or with the average resultant bending strain. The confidence value for the average resultant bending strain may, for example, be based on the value of a standard
deviation of a normal distribution fitted to the plurality of resultant bending strains.

Preferably, the processor is configured to calculate a confidence value for a first sensor based on a comparison of resultant bending strains derived from the strain measurement from the first sensor with the average resultant bending strain.

Preferably, the strain sensors are located to provide bending strain measurements in at least three non-parallel directions.

Preferably, each of the strain sensors is an optical strain sensor, such as a Fibre Bragg Grating sensor.

Preferably, the system comprises at least four strain sensors on the turbine blade; and the signal processor is further configured to compare the confidence value with a confidence threshold, and if the confidence value is less than the confidence threshold, re-calculate an average resultant bending strain without using the strain measurement from the first strain sensor.

Preferably, the system comprises at least five strain sensors on the turbine blade. Preferably, the strain sensors are located symmetrically around the longitudinal axis of the blade.

In a third aspect of the invention, there is provided a method of monitoring bending strain on a wind turbine blade, comprising:
  locating at least three strain sensors on the turbine blade, in use each strain sensor providing a strain measurement, the strain sensors located such that edgewise and flapwise bending can be determined from the strain measurements;
  calculating a plurality of resultant bending strains using the strain measurements;
  calculating an average resultant bending strain from the plurality of resultant bending strains; and
  calculating a confidence value for a first sensor based on a comparison of resultant bending strains derived from the strain measurement from the first sensor with the average resultant bending strain.

The individual strain measurements may be converted into bending moments before calculating resultant bending moments and average resultant bending moment. This is useful if the relationship between bending strain and bending moment is not the same for all of the sensors. This might be the case if the blade cross-section at the position of the sensors is not symmetrical and homogenous. Accordingly, the terms "resultant bending strain" and "average resultant bending strain" as used herein should be interpreted to include "resultant bending moment" and average resultant bending moment" respectively.

Each resultant bending strain is preferably calculated from bending strain measurements taken from a different pair of strain sensors, where the strain sensors in each pair provide bending strain measurements in directions non-parallel to one another. Depending on the type and orientation of the strain sensors, each bending strain measurement may be a simple strain measurement output from a strain sensor or may be a strain measurement from a strain sensor processed to remove non-bending components from the is strain measurement.

The confidence value may be calculated in a number of ways. For example, the confidence value may be based on an absolute difference between the resultant bending strains derived from measurement from the first sensor with the average resultant bending strain. Alternatively, the confidence value may be based on a number of standard deviations that the bending strain measurement from the first sensor is from the average resultant bending strain.

Preferably, the method further comprises locating at least four strain sensors on the turbine blade; and further comprises the step of comparing the confidence value with a confidence threshold, and if the confidence value is less than the confidence threshold, re-calculating an average resultant bending strain without using the strain measurement from the first strain sensor.

Preferably, the method further comprises the step of calculating a confidence value for the average resultant bending strain. Preferably, the confidence value for the average resultant bending strain is based on a comparison of the plurality of resultant bending strains with each other, or with the average resultant bending strain. The confidence value for the average resultant bending strain may, for example, be based on the value of a standard deviation of a normal distribution fitted to the plurality of resultant bending strains.

Preferably, the strain sensors are located to provide bending strain measurements in at least three non-parallel directions. Preferably, the sensors are all positioned substantially equidistant from the root end of the blade.

Preferably, each of the strain sensors is an optical strain sensor, such as a Fibre Bragg Grating sensor.

Preferably, the method further comprises locating at least five strain sensors on the turbine blade. Preferably, the strain sensors are located symmetrically around the longitudinal axis of the blade. This allows for a simple calculation of bending strain for each strain sensor and the ability to recalculate the average bending strain based on measurements from only three or four of the strain sensors if one or two strain sensors give erroneous measurements. To provide for greater redundancy and greater resolution precision and confidence, a greater number of strain sensors may be used.

Preferably, the method further comprises calculating non-bending components of the strain measurements from the strain sensors. Preferably, the method further comprises calculating twisting torque about the longitudinal axis of the blade from the strain measurements from the strain sensors. The twisting torque may be calculated as an average from a plurality of measurements.

In a fourth aspect of the invention, there is provided a method of monitoring bending strain on a wind turbine blade, comprising:
locating at least three strain sensors on the turbine blade, in use, each strain sensor providing a strain measurement, the strain sensors located such that edgewise and flapwise bending can be determined from the strain measurements;
  calculating a plurality of resultant bending strains using the strain measurements;
  calculating an average resultant bending strain from the plurality of resultant bending strains; and
  calculating a confidence value for the average resultant bending strain based on a comparison of the plurality of resultant bending strains with each other or with the average resultant bending strain. The confidence value for the average resultant bending strain may, for example, be based on the value of a standard deviation of a normal distribution fitted to the plurality of resultant bending strains.

Each resultant bending strain is preferably calculated from bending strain measurements taken from a different pair of strain sensors, where the strain sensors in each pair provide bending strain measurements in directions non-parallel to one another. Depending on the type and orientation of the strain sensors, each bending strain measurement may be a simple strain measurement output from a strain sensor or may be a strain measurement from a strain sensor processed to remove non-bending components from the strain measurement. Preferably, the sensors are all positioned substantially equidistant from the root end of the blade.

In a fifth aspect, the invention is a system for monitoring bending strain on a wind turbine blade, comprising:
at least three strain sensors located on the turbine blade, in use, each strain sensor providing a strain measurement, the strain sensors located such that edgewise and flapwise bending can be determined from the strain measurements; and
  a signal processor connected to each of the strain sensors, the signal processor configured to:
  calculate a plurality of resultant bending strains using the strain measurements;
  calculate an average resultant bending strain from the plurality of resultant bending strains; and
  calculate a confidence value for a first sensor based on a comparison of resultant bending strains derived from the strain measurement from the first sensor with the average resultant bending strain.

Preferably, the strain sensors are located to provide bending strain measurements in at least three non-parallel directions.

Preferably, each of the strain sensors is an optical strain sensor, such as a Fibre Bragg Grating sensor.

Preferably, the system comprises at least four strain sensors on the turbine blade, and the signal processor is further configured to compare the confidence value with a confidence threshold, and if the confidence value is less than the confidence threshold, re-calculate an average resultant bending strain without using the strain measurement from the first strain sensor.

Preferably, the signal processor is further configured to calculate a confidence value for the average resultant bending strain. Preferably, the signal processor is configured to calculate the confidence value for the average resultant bending strain based on a comparison of the plurality of resultant bending strains with each other, or with the average resultant bending strain. The confidence value for the average resultant bending strain may, for example, be based on the value of a standard deviation of a normal distribution fitted to the plurality of resultant bending strains.

Preferably, the system comprises at least five strain sensors on the turbine blade. Preferably, the strain sensors are located symmetrically around the longitudinal axis of the blade.

In a sixth aspect, the invention is a system for monitoring bending strain on a wind turbine blade, comprising:
  at least three strain sensors located on the turbine blade, in use, each strain sensor providing a strain measurement, the strain sensors located such that edgewise and flapwise bending can be determined from the strain measurements; and
  a signal processor connected to each of the strain sensors, the signal processor configured to:
  calculate a plurality of resultant bending strains using the strain measurements;
  calculate an average resultant bending strain from the plurality of resultant bending strains; and
  calculate a confidence value for the average resultant bending strain based on a comparison of the plurality of resultant bending strains with each other or with the average resultant bending strain. The confidence value for the average resultant bending strain may, for example, be based on the value of a standard deviation of a normal distribution fitted to the plurality of resultant bending strains.

Preferably, the strain sensors are configured to allow both twisting torque about the longitudinal axis of the blade and bending moments to be derived from their outputs. Preferably, the plurality of strain sensors comprise at least one pair of adjacent strain sensors positioned on the blade such that their sensitive axes are non-parallel with the longitudinal axis of the blade. Preferably, the sensitive axes of each pair of sensors are disposed symmetrically about a line parallel with the longitudinal axis of the blade but are not perpendicular to it. The strain measurements from each pair of sensors can then be simply combined to resolve bending strain and torque strain. For example, each pair of sensors may be arranged in a "V" shape or an "X" shape.

It should be clear that when reference is made to a confidence value or error threshold, such a value may equally be expressed as an error value or error threshold. Confidence values can be compared with a threshold confidence determine if the confidence value is less than the confidence threshold. To provide the same information, a corresponding error value can be compared with an error threshold to determine if the error value is greater than the error threshold. Accordingly, the term "confidence value" should be understood to encompass "error value" and the term "confidence threshold" should be understood to encompass "error threshold".

In a seventh aspect, the invention is a system for monitoring a wind turbine blade comprising a pair of strain sensors located on the wind turbine blade positioned on the blade such that their sensitive axes are non-parallel with a longitudinal axis of the blade, the sensitive axes being disposed symmetrically about a line parallel with the longitudinal axis of the blade but not perpendicular to it.

BRIEF DESCRIPTION OF THE DRAWINGS

Embodiments of the present invention will now be described in detail, by way of example only, with reference to the accompanying drawings, in which:

FIG. 5b is a detailed view of the crossing points of lines P1 to P5 in FIG. 4a;

is FIG. 6b is a detailed view of the crossing points of lines P1 to P5 in FIG. 5a.

DETAILED DESCRIPTION

Figure 1:
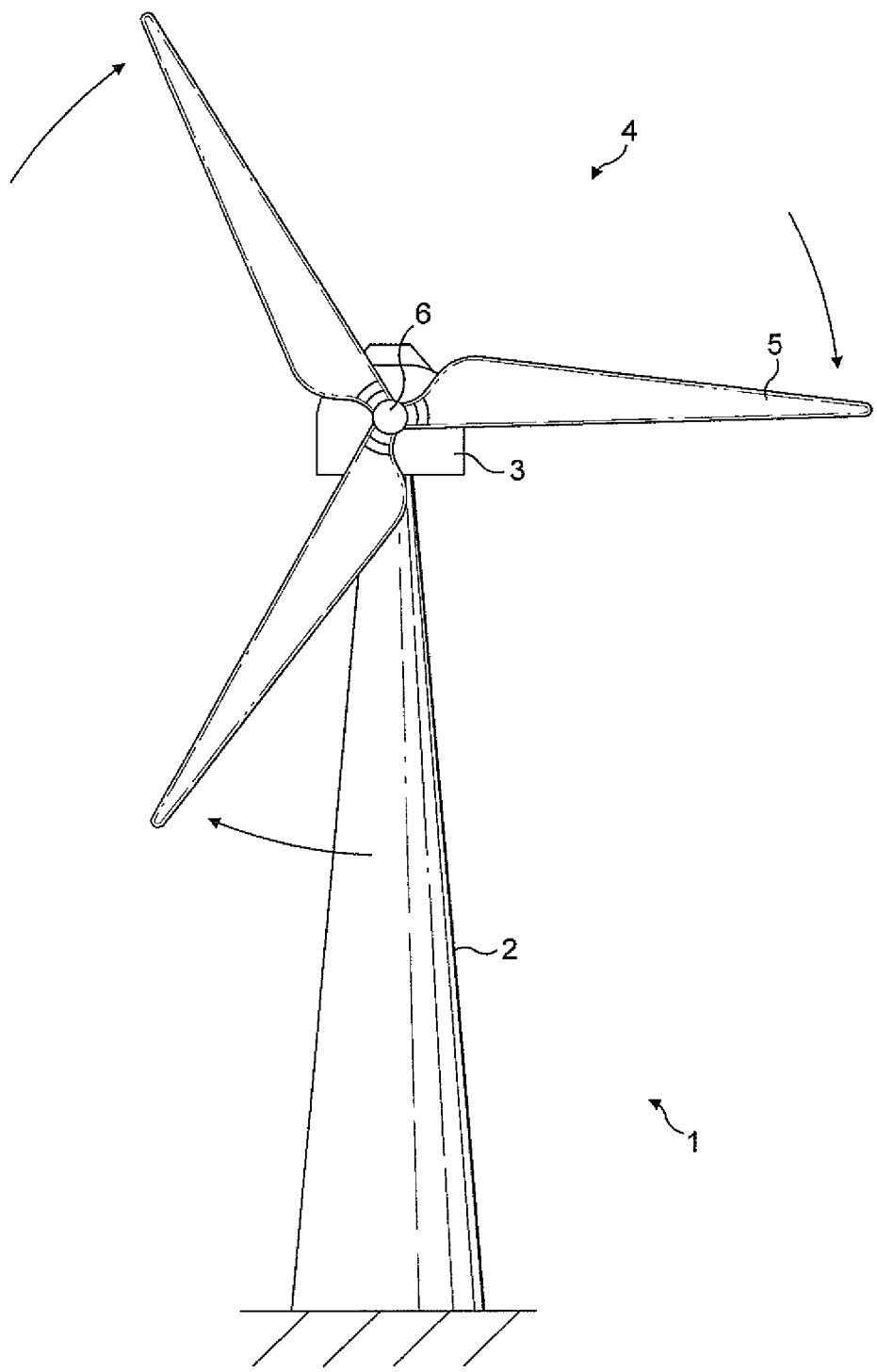
FIG. 1 is a schematic illustration of a wind turbine.
Figure 2:
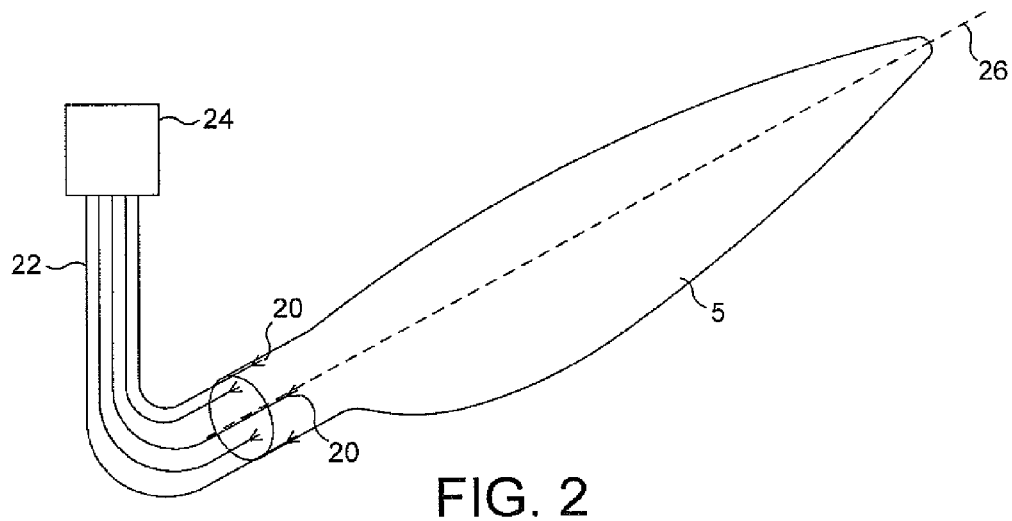
FIG. 2 is a schematic illustration of a monitoring system in accordance with the present invention.

FIG. 2 shows a wind turbine blade 5 with five pairs of strain sensors 20 positioned around a root end of the turbine blade, in accordance with an embodiment of the present invention. The pairs of strain sensors 20 are Fibre Bragg Grating (FBG) sensors within optical fibres, arranged in a "V" configuration. Each of the optical fibres 22 in which the FBGs are formed is connected to a signal processor 24. The signal processor 24 has an output 26, for providing strain measurements for use in diagnostics and/or control of the wind turbine.

Figure 3:
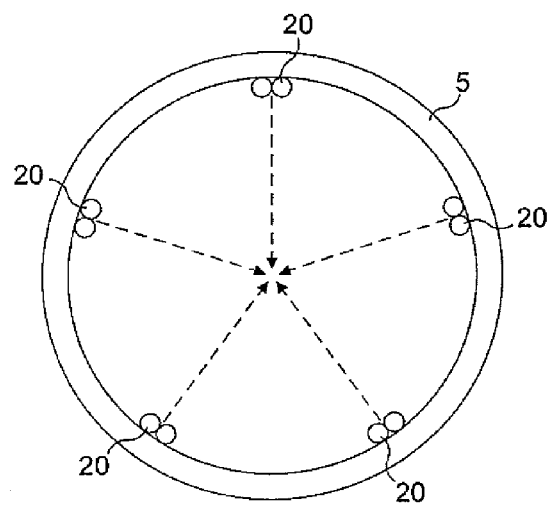
FIG. 3 is a schematic cross section showing the position of the strain sensors of FIG. 2.

FIG. 3 is a schematic cross section of the root of the blade shown in FIG. 2. It can be seen from FIG. 3 that the FBGs 20 are disposed symmetrically around the longitudinal axis of the blade 5. The sensors are also positioned equidistant from the root end of the blade in the longitudinal direction.

Other forms of optical strain sensor may alternatively be used, such as long Period Gratings. Piezoelectric or semiconductor strain sensors may also be used, but for wind turbines it is preferable to use sensors that do not contain electrically conductive components, as electrically conductive components significantly increase the chances of lightening strikes on the wind turbine.

The strain sensors are configured to allow for a determination of twisting torque about the longitudinal axis 26 of the blade 5. The signal processor 24 is configured to determine the twisting torque and to compare the twisting torque with a comparison value or predicted value for the torque based on one or more other measured parameters that correlate with twisting torque when the blade is operating under normal operating conditions.

In this embodiment, the bending moment on the blade is used as the parameter that correlates with the torque on the blade under normal operating conditions. Other parameters may be used, in addition, to improve correlation, or as an alternative to bending moment. For example measurement of wind speed, angle of attack of the blades and air temperature may be used as measured parameters.

The comparison may be made with the measured torque or with a value derived from it. So, in this example, the comparison may be made between the measured torque and a predicted torque derived from the amount of bending moment on the blade, or it may be made between the bending moment (the comparison value) and value derived from the measured torque, or it may be made between a value derived from the measured torque and an expected value derived from the bending moment. In other words, the measured torque may be mathematically manipulated in some way before the comparison is made without affecting the ability to detect the presence of ice on the blade or damage to the blade.

The comparison values with which comparison is made may be stored in a look-up table in a memory connected to the processor or may be calculated continually from the measured parameter or parameters. Typically in the design of a wind turbine blade complex computer models of the mechanical properties of the blade are used. These models may be based on finite element analysis, for example. These computer models can be used to provide the relationship between measured strains and the bending moment and twisting torque. They can also be used to provide the relationship between bending moment and twisting torque. Alternatively, values for populating a look-up table may be derived by operating the wind turbine under conditions in which it is known that no ice is present (herein referred to as normal operating conditions), or based on empirical data obtained from wind turbine blades of identical design. For example, the look-up table may comprise torque values for a range of measured bending moments.

If the torque about the longitudinal axis of the blade falls below the comparison value by more than a predetermined amount, then it can be inferred that ice or some other matter that disrupts the flow of air across the blade is present. If the torque is higher than expected under normal operating conditions then some kind of structural damage to the blade may have occurred.

The predetermined amount of difference used as the threshold for the determination of ice build-up can be based on the known resolution of the sensors used and/or a confidence value associated with the measurements used. There may also be an amount of ice or debris on the blade that can be safely tolerated. The predetermined amount may also be based on known variations in the relationship between the torque and the measured parameter due to environmental changes, such as air density or pressure, that typically remain within known limits.

In order to measure the bending moment and the twisting torque on the blade, strain sensors 20 are placed round the root of the blade 5. In the embodiment shown in FIGS. 2 and 3, the same sensors 20 are used to determine bending moment and torque. However, separate sets of sensors, of the same or different types may be used.

In the example shown in FIG. 2, the strain sensors 20 are positioned symmetrically around the longitudinal axis of the turbine blade 5, and are equidistant from the root end of the blade. Positioning the sensors symmetrically i.e. angularly equally spaced with respect to the longitudinal axis 26 of the blade, has advantages in the processing of strain measurements from the strain sensors. However, it should be clear that symmetrical disposition of the sensors is not essential for operation of the system in accordance with the present invention. Furthermore, if the strain sensors are all placed in the round, homogenous part of a turbine blade close to the hub it is not necessary for all of the sensors to be equally spaced from the root end of the blade, as the measured strains will be the same irrespective of the longitudinal position of the sensors within that round cross-section portion of the blade. However, if the blade cross-section at the position of the sensors is not symmetrical in any way, then the sensors should be arranged to be equidistant from the root and of the blade.

Twisting torque and bending moments can be derived from the measured twisting and bending strains using the computer models described above, which are typically based on finite element analysis, or based on empirical data.

Figure 4A:
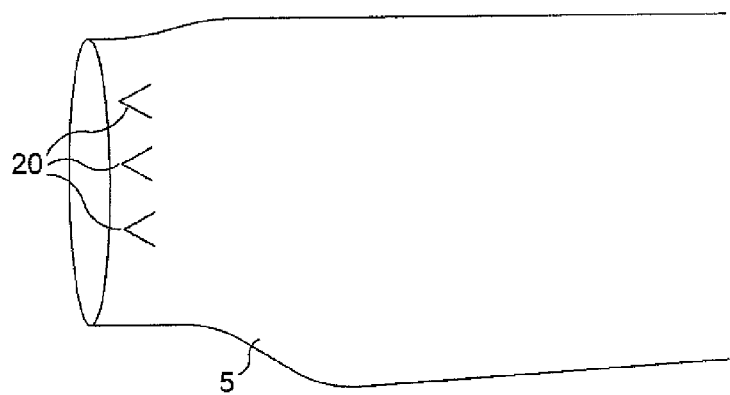
FIG. 4a is a schematic illustration of a first configuration of pairs of strain sensors for resolving bending and twisting strain.
Figure 4B:
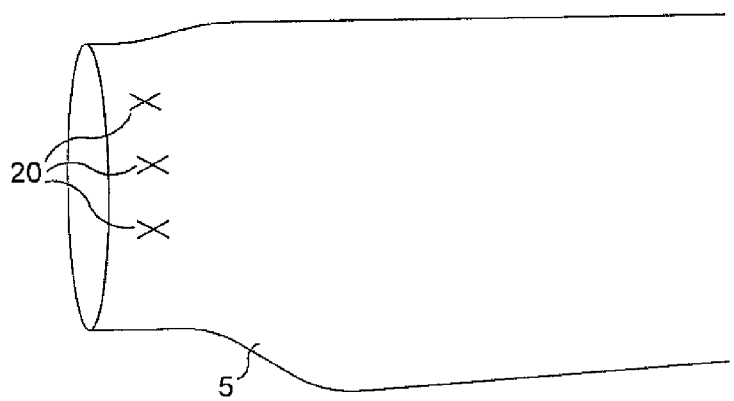
FIG. 4b is a schematic illustration of a second configuration of pairs of strain sensors for resolving bending and twisting strain.
Figure 4C:
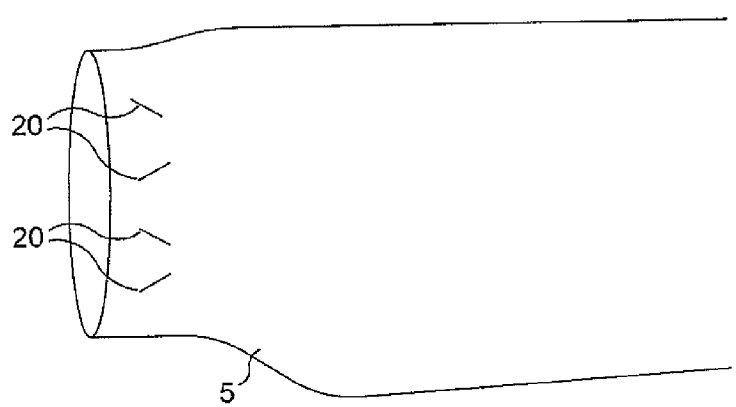
FIG. 4c is a schematic illustration of a third configuration of pairs of strain sensors for resolving bending and twisting strain.

In order to measure both the bending strain and the twisting strain on the root of the blade, the strain sensors are arranged in pairs. Each sensor in a pair is arranged to be sensitive to strain in a direction non-parallel to the longitudinal axis 26 of the blade. For ease of signal processing the sensors 20 in each pair are best arranged so that they are symmetrically disposed about a line parallel to the longitudinal axis of the blade. FIGS. 4a, 4b and 4c show possible configurations of the sensor pairs.

FIG. 4a shows "V" shaped pairs of sensors arranged on the root of the blade. Each pair of sensors may be FBGs, embedded in the same or different optical fibres. By comparing the strain measured by each sensor with the strain measured by the other sensor in the pair, both torque and longitudinal strain (from which bending moments may be derived) can be determined. FIG. 4b shows "X" shaped pairs of sensors and FIG. 4c shows "V" shaped pairs of sensors with greater spacing between the sensors in each pair. All of these arrangements operate on the same principle.

The bending strain measured by each pair of sensors 20 is determined by its position. The bending strain measured by each pair of FBG is the strain in a radial direction, i.e. in a direction towards the centre of the root of the turbine blade 5, although it is derived from a measure of strain in a direction parallel to the longitudinal axis of the blade. This is clearly illustrated in FIG. 3 by the dotted lines extending from each sensor.

Figure 5A:
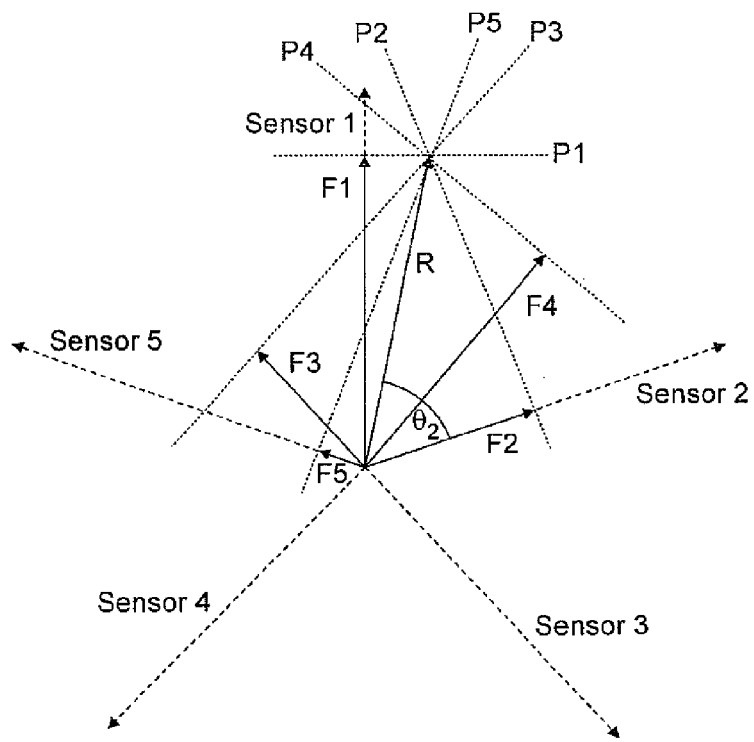
FIG. 5a is a graphical illustration of the calculation of bending strain using the sensors of FIGS. 2 and 3, in accordance with a first example.

FIG. 5a is a graphical illustration of how the bending strain measurements from the sensors are used to provide a resultant bending strain measurement.

The FBG strain sensors shown in FIGS. 2, and 3 are affected not only by bending strain but also by strain parallel to the longitudinal axis of the blade, by twisting strain and by temperature changes. Before calculating a resultant bending strain or bending moment, the strain measurements from each sensor are added together and then divided by the number of sensors to provide an average strain. Contributions to the strain resulting from strain in a longitudinal direction of a turbine blade e.g. those due to centripetal force, will be the same for all of the sensors. The contribution to the strain measurements from bending forces acting in the plane defined by the sensors, will add up to zero if the sensors are symmetrically disposed. Accordingly, subtraction of the average strain measurement from the strain measurement taken by each of the sensors will result in removal longitudinal strain from the strain measurement. Twisting strain is removed from the strain measurements by adding the strain measurements within each pair of sensors together. The resulting strain measurement for each pair of sensors is referred to herein as a bending strain measurement. Temperature compensation may still be required, and one or more temperature sensors may be provided on the blade for that purpose. Temperature sensors may also be provided to determine if conditions are such that ice formation is a possibility.

In FIG. 5a the bending strain measurement from each of the sensors, labelled S1, S2, S3, S4 and S5, is illustrated as vector F1, F2, F3, F4 and F5 respectively. The bending strain measured by each of the sensors can be understood as a force that points in the radial direction defined by the mounting position of the sensor. The bending strains are illustrated in FIG. 5a as emanating from a single point, the centre of the root of the blade. The actual or resultant bending strain is illustrated by vector R which comprises both edgewise and flapwise components, and from which the edgewise and flapwise components can be simply derived. The resultant strain R can be determined from the five bending strain measurements F1 to F5. The bending strain measured by each strain sensor is the component of the resultant bending strain in the radial direction defined by the position of the sensor. This is clearly shown in FIG. 4a where lines P1 to P5 are drawn from the resultant bending strain R to each of the measured bending strains F1 to F5, at right angles to each of the measured bending strains. So one way to calculate the resultant bending strain from the measured bending strain is to simply determine where the lines P1 to P5 cross. This can be understood algebraically as solving simultaneous equations for two variables, i.e. the magnitude and direction of the resultant bending strain, from five simultaneous equations.

The individual strain measurements may be converted into bending moments before calculating resultant bending moments and average resultant bending moment, rather than calculating resultant bending strains and an average resultant bending strain directly from the strain measurements. This is useful if the relationship between bending strain and bending moment is not the same for all of the sensors. This might be the case if the blade cross-section at the position of the sensors is not symmetrical and homogenous.

In the examples shown in FIG. 5a, $\theta_N$ is the angle between the bending strain $F_N$ measured by sensor N (N=1, 2, 3, 4, 5) and the resultant strain R measured in a clockwise direction from R (only $\theta_2$ is shown). $|F_N|$ is the magnitude of the strain $F_N$ detected by each strain sensor.

The simultaneous equations for the resultant strain are then:

$$|R|=|F_1|/\cos\theta_1=|F_2|/\cos\theta_2=|F_3|/\cos\theta_3=|F_4|/\cos\theta_4=|F_5|/\cos\theta_5.$$

There is known relationship between $\theta_1$, $\theta_2$, $\theta_3$, $\theta_4$ and $\theta_5$ so long as the position of the sensors is known, so there are only two unknowns to solve for. In the examples shown in FIG. 5a there are five sensors equally spaced so that $\theta_1=\theta_2-2\pi/5=\theta_3-4\pi/5=\theta_4-6\pi/5=\theta_5-8\pi/5$. Where the measured strain is compressive i.e. negative, the magnitude |F| should be negative.

Only two equations are needed to provide a solution for the two unknowns, |R| and $\theta$. But with N sensors, there are N simultaneous equations. There are therefore $\frac{1}{2}N(N-1)$ pairs of equations that can be used to provide a solution for R. With N=5 there are 10 possible solutions, corresponding to the 10 crossing points of lines P1 to P5.

Figure 5B:
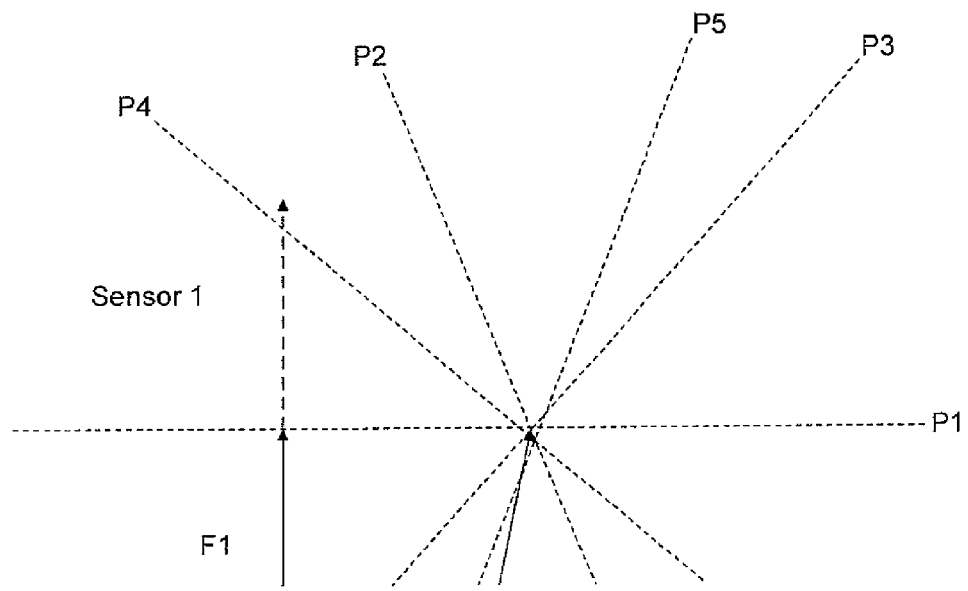

In theory each of these solutions for |R| and $\theta$ should be identical. This corresponds to the situation in which each of the lines P1 to P5 in FIG. 5 cross at exactly the same point. In reality, not all of the solutions for |R| and θ will be the same. This is illustrated in FIG. 5b which shows that each of the lines P1 to P5 do not cross at the same point. The different solutions are due to several kinds of problems, including sensor similarity, variations in the material properties of the blade, measurement resolutions and alignment of the sensors. It may also be the case that one or more of the sensors is faulty or broken.

Rather than selecting simply one solution as the resultant bending strain the resultant bending strain can be calculated as an average of all of the possible solutions i.e. an average of all of the crossing points of lines P1 to P5 in FIG. 5b. The average can be a simple mean for the magnitude and direction, calculated by summing and dividing all of the possible solutions. Alternatively, a two-dimensional normal distribution can be fitted to the results, which provides not only a convenient average but also a convenient measure of confidence in the result, based on the standard deviation from the mean. Other measures of confidence or accuracy in the resultant bending strain are also possible, such a simple average of the deviation of each result from the mean.

Providing a measure of confidence in the average resultant bending strain can be extremely useful. It allows the basis for a decision on whether to stop the turbine to remove ice or clean the blades to factor in how accurate the measurements are. If the confidence value is high that there is a tolerable amount of ice on the turbine blade then the turbine blade can continue to operate. If the confidence value is low, a greater margin of error can be used and any amount of ice close to the maximum tolerable level may require the turbine to be stopped.

Figure 6A:
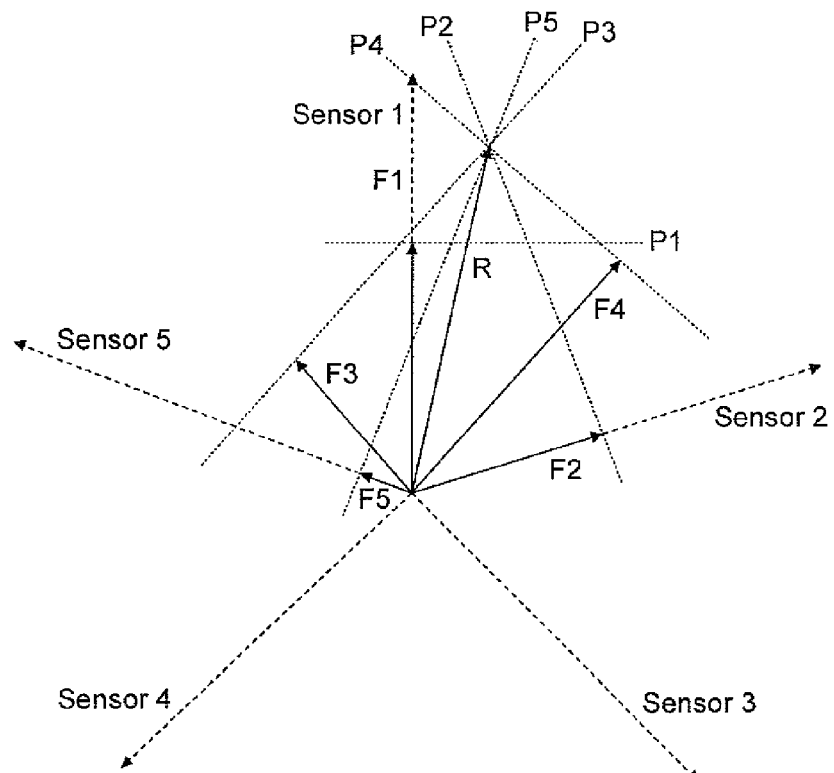
FIG. 6a is graphical illustration of the calculation of the bending strain using sensors shown in FIGS. 2 and 3, in a second example.
Figure 6B:
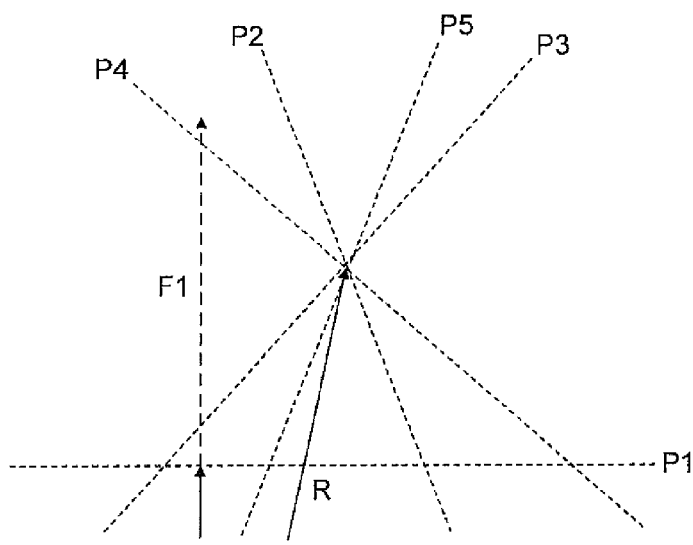

A system in accordance with the present invention can also allow faulty, badly installed or broken sensors to be detected and their measurements discounted from the strain calculations. FIG. 6a is a similar diagram to that of FIG. 5a, but for a different set of example measurements. Again the bending strain measurements (from which non bending strain contributions have been subtracted) are represented by lines F1 to F5. Perpendicular lines P1 to P5 have been drawn from the ends of each of F1 to F5, and the crossing points of lines P1 to P5 represent possible solutions for the resultant bending strain R. It can be seen in FIG. 5a that the result obtained from sensor 1 i.e. bending strain F1, provides very different solutions from the results obtained using combinations of the other sensors. The line P1 does not cross the lines P2, P3, P4 or P5 near the area in which lines P2 to P5 cross each other. FIG. 6b is a detailed view of the crossing points of the lines P1 to P5 in FIG. 6a. In this example, the strain measurement F1 is clearly erroneous and should be ignored. The resultant bending strain can be better calculated using only the measurements from sensors 2 to 5 i.e. bending strains F2 to F5 as illustrated.

In order to determine whether or not a particular strain measurement is faulty, the solutions for resultant bending strain R provided using that strain measurement are compared to the average solution for R. If the difference between the results using one of the strain sensors are all (or alternatively on average) greater than a threshold difference value, then measurements from that strain sensor can be discarded and the calculations (including those calculations removing non-bending strain contributions from the strain measurements) are repeated without input from the faulty sensor. The threshold value can be set as an absolute value or as a number of standard deviations away from the mean value or any other suitable method, such as a proportion of the average resultant bending strain. This process of comparing each result with an average result can be fully automated within the signal processor and may provide a confidence value for each sensor and provide an alert when a faulty sensor is detected i.e. when the threshold level is exceeded. This allows the system to provide more accurate results and provide automated diagnostics.

Even if no sensor is found to be faulty, a confidence value for each strain sensor can be provided to an external diagnostics unit for subsequent analysis.

Although specific methods for calculating average strain and strain confidence values have been described, any suitable analysis methods may be used to give a resultant bending strain and confidence values both in the average bending strain and in the measurement from each individual sensor.

In order to provide the capability to calculate resultant bending strain accurately while discarding measurements from one or more of the available strain sensors, sufficient strain sensors need to be provided. The minimum number of FBG strain sensors needed to provide a resultant bending strain measurement in two dimensions is three FBG sensors. In order to provide redundancy, more than three strain sensors need to be provided. In a preferred embodiment five or more sensors are provided. The more sensors that are provided the greater the resolution, precision and confidence of measurement that can be obtained and the lower the threshold for discarding erroneous measurements can be set.

The invention claimed is:

1. A method of detecting ice or other foreign matter on a windturbine blade or damage to a wind turbine blade, the wind turbine blade mounted to a hub and having a longitudinal axis extending away from the hub, comprising:
   measuring twisting torque on the blade about its longitudinal axis to provide a detected torque signal;
   comparing the detected torque signal with a comparison value, the comparison value derived from one or more measured parameters having a predetermined relationship with the twisting torque about the longitudinal axis of the blade when the blade is operating under normal operating conditions, wherein the one or more measured parameters comprise bending moments on the blade; and
   determining that ice or other foreign matter is on the blade or that the blade is damaged if the detected torque signal differs from the comparison value by more than a predetermined amount.

2. A method according to claim 1, further comprising the step of establishing a relationship between the bending moments on the blade and the twisting torque about the longitudinal axis of the blade under normal operating conditions.

3. A method according to claim 1, further comprising measuring the bending moments on the blade.

4. A method according to claim 3, wherein the step of measuring the bending moments comprises:
   locating at least three strain sensors on the turbine blade, in use each strain sensor providing a strain measurement, the strain sensors located such that edgewise and flapwise bending moments can be determined from the strain measurements;
   calculating a plurality of resultant bending strains using the strain measurements; and
   calculating an average resultant bending strain from the plurality of resultant bending strains.

5. A method according to claim 4, further comprising the step of calculating a confidence value for the average resultant bending strain.

6. A method according to claim 5, wherein the confidence value for the average resultant bending strain is based on a comparison of the plurality of resultant bending strains with each other, or based on a comparison of the plurality of resultant bending strains with the average resultant bending strain.

7. A method according to claim 4, wherein the at least three strain sensors are all substantially equidistant from a root end of the blade.

8. A method according to claim 4, wherein each resultant bending strain is calculated from bending strain measurements taken from a different pair of the at least three strain sensors, where the strain sensors in each pair provide bending strain measurements in directions non-parallel to one another.

9. A method according to claim 4, wherein the step of measuring the bending strain further comprises the step of calculating a confidence value for a first strain sensor of the at least three strain sensors based on a comparison of the resultant bending strain derived from the strain measurement from the first strain sensor with the average resultant bending strain.

10. A method according to claim 9, wherein locating the at least three strain sensors on the turbine blade comprises locating at least four strain sensors on the turbine blade; and further comprising the step of comparing the confidence value for the first sensor with a confidence threshold, and if the confidence value for the first sensor is less than the confidence threshold, re-calculating an average resultant bending strain without using the strain measurement from the first strain sensor.

11. A method according to claim 4, wherein the at least three strain sensors are located to provide bending strain measurements in at least three nonparallel directions.

12. A method according to claim 4, wherein each of the at least three strain sensors is an optical strain sensor.

13. A method according to claim 4, wherein locating the at least three strain sensors on the turbine blade comprises locating at least five strain sensors on the turbine blade.

14. A method according to claim 4, wherein the at least three strain sensors are located symmetrically around the longitudinal axis of the blade.

15. A method according to claim 1, wherein the step of measuring twisting torque on the blade about its longitudinal axis comprises locating strain sensors on the blade.

16. A method according to claim 15, wherein the strain sensors are located such that twisting torque and the bending moment can be derived from outputs of the strain sensors.

17. A method according to claim 16, wherein the strain sensors comprise at least one pair of adjacent strain sensors, and wherein the step of measuring twisting torque comprises locating the at least one pair of adjacent strain sensors on the blade such that their sensitive axes are non-parallel with the longitudinal axis of the blade.

18. A method according to claim 17, wherein the sensitive axes of each pair of adjacent strain sensors are disposed symmetrically about a line parallel with the longitudinal axis of the blade.

19. A system for detecting ice or other foreign matter on a wind turbine blade or damage to a wind turbine blade, the wind turbine blade mounted to a hub and having a longitudinal axis extending away from the hub, comprising:
one or more strain sensors mounted on the turbine blade and configured to provide a measure of the twisting torque on the blade about its longitudinal axis; and a processor configured to:
compare the measure of the twisting torque with a comparison value, wherein the processor is configured to calculate the comparison value based on one or more measured parameters having a predetermined relationship with the twisting torque about the longitudinal axis of the blade when operating under normal operating conditions, and wherein the one or more measured parameters comprise a bending moment on the blade; and
determine that ice or other foreign matter is on the blade, or that the blade is damaged if the value based on the measure of the twisting torque differs from the comparison value by more than a predetermined amount.

20. A system according to claim 19, wherein the one or more strain sensors are configured to allow both twisting torque about the longitudinal axis of the blade and bending moments on the blade to be derived from their outputs.

21. A system according to claim 20, wherein the one or more strain sensors comprise at least one pair of adjacent strain sensors positioned on the blade such that their sensitive axes are non-parallel with the longitudinal axis of the blade.

* * * * *